United States Patent [19]

Tanten et al.

[11] Patent Number: 5,744,717

[45] Date of Patent: Apr. 28, 1998

[54] CIRCUIT ARRANGEMENT FOR A CAPACITIVE ACCELERATION SENSOR

[75] Inventors: Leo Tanten, Reutlingen; Ulrich Fleischer, Pliezhausen; Michael Barth, Kirchheim/Teck; Bernd Mueller, Reutlingen, all of Germany

[73] Assignee: Robert Bosch GmbH, Stuttgart, Germany

[21] Appl. No.: 677,674

[22] Filed: Jul. 8, 1996

[30] Foreign Application Priority Data

Jul. 6, 1995 [DE] Germany ............. 195 24 604.7

[51] Int. Cl.⁶ ........................................ G01P 15/125
[52] U.S. Cl. ............................................. 73/514.18
[58] Field of Search ................ 73/514.18, 514.32, 73/862.61

[56] References Cited

U.S. PATENT DOCUMENTS 4,805,456  2/1989  Howe et al. ............. 73/514.18
5,205,171  4/1993  O'Brien et al. ........... 73/514.18

FOREIGN PATENT DOCUMENTS

WO 92/03740  3/1992  WIPO.

*Primary Examiner*—John E. Chapman
*Attorney, Agent, or Firm*—Kenyon & Kenyon

[57] ABSTRACT

In a circuit arrangement, in particular for a capacitive acceleration sensor having a first capacitor and a second capacitor, the two capacitors have a common middle electrode, which is movably supported in dependence upon an acting acceleration. A position-control circuit applies a voltage to the outer electrodes of the capacitors so as to keep the capacitors equal in size. An a.c. voltage is applied to the middle electrode and the a.c. current adjusting itself at the capacitors is evaluated for purposes of position control.

2 Claims, 1 Drawing Sheet

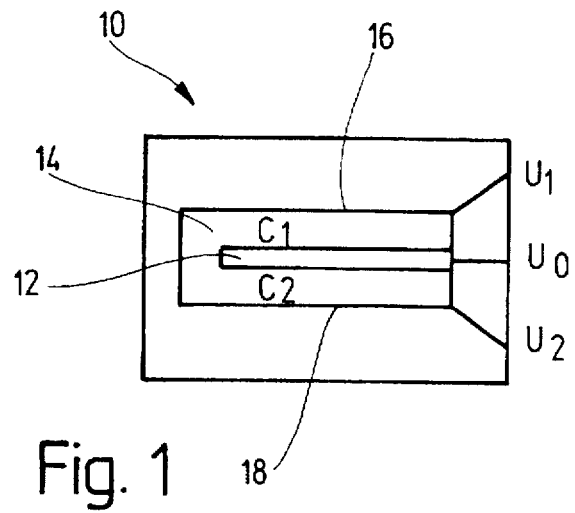
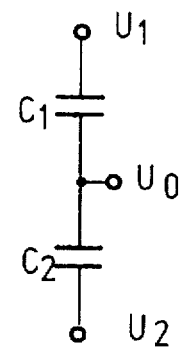
Fig. 1
Fig. 2
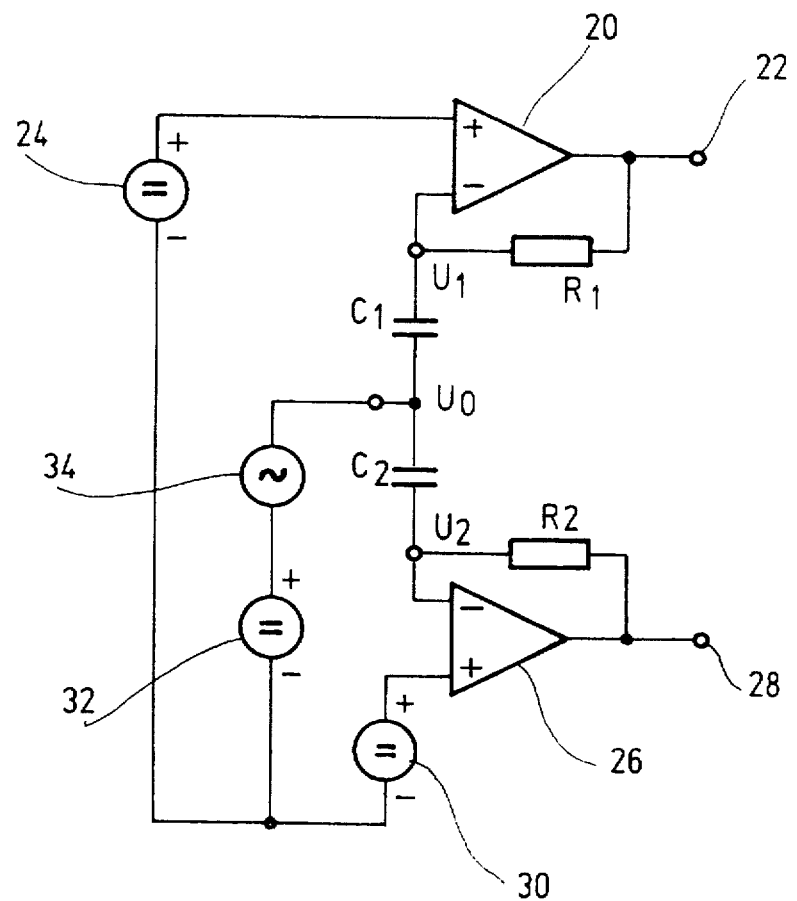
Fig. 3

CIRCUIT ARRANGEMENT FOR A CAPACITIVE ACCELERATION SENSOR

BACKGROUND INFORMATION

To detect an acting acceleration, for example in motor vehicles, it is known to use capacitive acceleration sensors. As a rule, the capacitive acceleration sensors are composed of two capacitors with a common middle electrode. The common middle electrode is movably supported between the outer electrodes of the capacitors. The middle electrode moves in response to an occurring acceleration, so that the capacitances vary. Depending on the direction, of acceleration, the one capacitance is increased and the other decreased, or vice versa. To evaluate the variations in capacitance, it is known to provide a position control circuit, which applies a voltage to the outer electrodes. The voltage is so adjusted that an electrostatic attractive force between the electrodes of the capacitors prevents the middle electrode from deflecting. Depending on the magnitude of the occurring acceleration, a position-control voltage of a corresponding magnitude is required. By the level of the position-control voltage being applied at the outer electrodes to keep the capacitors equal in size, a signal that is proportional to the acceleration detected by the acceleration sensor can be extracted and evaluated.

It is known, for example, from International Patent Application No. WO 92/03740 to capacitively inject an a.c. voltage phase-displaced by 180° at the outer electrodes. A resulting a.c. voltage at the middle electrodes yields a measure for determining the ratio between the two capacitances. If the a.c. voltage at the middle electrode is no longer measurable, the capacitances are equal. A disadvantage here is that because a.c. voltage signals are fed in at the outer electrodes of the capacitors, parasitic capacitances existing there lead to an attenuation of the signal. Since the parasitic capacitances are at least partly-voltage-dependent, barrier-layer capacitances, the attenuation varies because of a differing position-control voltage at the outer electrodes, so that an error-free measurement of a difference in capacitance is not possible. Moreover, circuit arrangements of this type are very expensive, since two signals in exact phase opposition and of the same amplitude must be generated.

SUMMARY OF THE INVENTION

An advantage of the circuit arrangement according to the present invention is that it enables a precise evaluation of the difference in capacitance between the two capacitors. Because an a.c. voltage is applied to the middle contact, and the a.c. current adjusting itself at the capacitors is evaluated for purposes of closed-loop position control, the position-control voltage at the outer electrodes remains constant, so that no a.c. voltage is measurable here. This makes it simply possible to suppress the influence that parasitic capacitances have on the generation of signals. Moreover, the a.c. voltage source can be built up relatively simply to supply the a.c. voltage, since a specific phase is not required for the middle electrode.

BRIEF DESCRIPTION OF THE DRAWINGS

FIG. 1 shows a schematic representation of a capacitive acceleration sensor.

FIG. 2 shows an equivalent circuit diagram of the acceleration sensor of FIG. 1.

FIG. 3 shows a circuit arrangement for determining a difference in the capacitance of the acceleration sensor.

DETAILED DESCRIPTION

FIG. 1 schematically depicts a capacitive acceleration sensor 10. The acceleration sensor 10 has a movable middle electrode 12, which can be designed, for example, as a bending bar that is secured on one side. The middle electrode 12 is arranged in a free space 14, which is delimited by outer electrodes 16 or 18 disposed essentially parallel to the middle electrode 12. Formed between the middle electrode 12 and the outer electrode 16 is a first capacitor $C_1$ and between the middle electrode 12 and the outer electrode 18 is a second capacitor $C_2$. The free space 14 or the medium present in the free space 14 constitutes the dielectric material of the capacitors $C_1$ and $C_2$. The middle electrode 12 is connected to a connection terminal $U_0$, the outer electrode 16 to a connection terminal $U_1$, and the outer electrode 18 to a connection terminal $U_2$.

The equivalent circuit diagram of the acceleration sensor 10 shown in FIG. 2 makes it clear that the capacitors $C_1$ and $C_2$ are interconnected to form a capacitor bridge.

If the acceleration sensor 10 is subjected to an acceleration, because of its movable suspension mount and its dynamic moment of inertia, the middle electrode 12 endeavors to move toward the outer electrode 16 or toward the outer electrode 18. This produces a variation in the capacitance of the capacitors $C_1$ and $C_2$. Depending on the direction of acceleration, the capacitor $C_1$ would become larger and the capacitor $C_2$ smaller or vice versa, since the clearance between the middle electrode 12 and the outer electrodes 16 and 18, respectively, that has a role in determining the capacitance becomes larger or smaller.

Now, if the voltage being applied to the connection terminals $U_1$ or $U_2$ is so adjusted that the electrostatic attractive force occurring between the middle electrode 12 and the outer electrodes 16 and 18, respectively, holds the middle electrode 12 in its central position even when acceleration occurs, so that the capacitors $C_1$ and $C_2$ are always equal in magnitude, then the position-control voltage to be applied supplies a signal that is proportional to the occurring acceleration. The middle electrode 12 is always retained in its mid-position when the outer electrodes 16 or 18 are automatically controlled to a constant potential.

FIG. 3 depicts a circuit arrangement which makes it possible to simply and automatically control the outer electrodes 16 and 18 to a constant potential. Those parts which are equivalent to those shown in FIGS. 1 and 2 are given the same reference symbols and not explained again. The connection terminal $U_1$ is linked to the inverting input of a first operational amplifier 20. The output of the operational amplifier 20 is connected via a negative feedback resistor $R_1$ to the inverting input, on the one hand, and to an input 22 of an evaluation circuit (not shown). The non-inverting input of the operational amplifier 20 is linked to a direct voltage source 24. The connection terminal $U_2$ communicates with the inverting input of a second operational amplifier 26. The output of the operational amplifier 26 is connected, on the one hand, via a negative feedback resistor $R_2$ to the connection terminal $U_2$ and to an input 28 of the evaluation circuit (not shown). The non-inverting input of the operational amplifier 26 is linked to a direct voltage source 30.

The connection terminal $U_0$ is connected to a direct voltage source 32 and to an a.c. voltage source 34 superposed on the direct voltage source 32. The direct voltage sources 24, 30 and 32 can also be comprised of a shared direct voltage source that is interconnected accordingly.

The circuit arrangement illustrated in FIG. 3 performs the following functions:

By means of the direct voltage source 32 and the a.c. voltage source 34, a direct voltage that is superposed with an a.c. voltage is injected at the connection terminal $U_0$. The a.c. voltage leads to a current flow via the capacitors $C_1$ and $C_2$. In the initial state, the middle contact 12 is in a position of rest, so that the capacitors $C_1$ and $C_2$ are equal in magnitude. As a result, the capacitors $C_1$ and $C_2$ possess an equivalent reactance for the alternating current, so that an exactly equivalent alternating current flows across the capacitors $C_1$ and $C_2$. Together with the resistors $R_1$ or $R_2$, the reactances of the capacitors $C_1$ and $C_2$ form a negative-feedback resistance circuit for the operational amplifiers 20 or 26.

The operational amplifiers 20 or 26 are operated as inverting amplifiers, so that the positive d.c. voltage being applied to the non-inverting input likewise results at the output of the operational amplifier in a positive output d.c. voltage. Since, as generally known, the amplification of the operational amplifier is stipulated by the ratio of the negative-feedback resistances, a change in the ratio of the negative-feedback resistances leads to a change in the amplification. The connection terminals $U_1$ and $U_2$ are automatically controlled to a constant potential by means of the negative feedback of the operational amplifiers 20 and 26, respectively.

The amplification effect of the operational amplifiers 20 or 26 is more or less intensive depending on the reactance of the capacitors $C_1$ or $C_2$ for the alternating current, which reactance changes in response to the action of an acceleration on the acceleration sensor 10. The amplification of the operational amplifiers 20 or 26 varies with the changing, adjusting ratios of the negative-feedback resistors $R_1$ and $R_2$ to the reactances of the capacitors $C_1$ and $C_2$. Thus, the current flowing through the capacitors $C_1$ and $C_2$ is evaluated on the basis of the operational amplifiers 20 or 26, and a corresponding amplification signal is generated. This amplification signal is applied to the connection terminals 22 or 28 connected to the evaluation circuit, the potential at the connection terminals $U_1$ and $U_2$ being constant at the same time because of the closed-loop control action of the operational amplifiers. Thus, by evaluating the amplification signals of the operational amplifiers 20 or 26, one can extract a signal that is proportional to the acceleration acting on the acceleration sensor 10.

Since the potentials at the connection terminals $U_1$ and $U_2$ are kept constant, there is also no a.c. voltage that can be measured (detected) at the connection terminals $U_1$ and $U_2$. By this means, the influence of parasitic capacitances, in particular their attenuation effect on the amplification signal, is eliminated. Any desired phase of the a.c. voltage source 34 can be selected, since it is the same in any case for both capacitors $C_1$ and $C_2$, because of the injection (the a.c. voltage fed in) at the middle contact $U_0$.

Thus, the circuit arrangement depicted in FIG. 3 offers the possibility of automatically controlling the direct voltage at the outer contacts 16 or 18 in a simple manner by way of an operational amplifier 20 or 26.

What is claimed is:

1. A circuit arrangement, comprising:

a first capacitor and a second capacitor having a first capacitance value and a second capacitance value, respectively, having a first outer electrode and a second outer electrode, respectively, and having a common middle electrode, the common middle electrode being movably supported as a function of an acceleration;

a position-control circuit for applying a voltage to the first and second outer electrodes so as to keep the first and second capacitance values equal;

an a.c. circuit for applying an a.c. voltage to the common middle electrode;

a first operational amplifier having a first inverting input and a first output, the first inverting input coupled to the first outer electrode;

a first negative-feedback resistor coupled between the first output of the first operational amplifier and the first outer electrode;

a second operational amplifier having a second inverting input and a second output, the second inverting input coupled to the second outer electrode; and a second negative-feedback resistor coupled between the second output of the second operational amplifier and the second outer electrode, wherein an a.c. current through at least one of the first and second capacitors is evaluated for position control.

2. The circuit arrangement according to claim 1, further comprising:

a first direct voltage source, a first positive pole of the first direct voltage source coupled to a first non-inverting input of the first operational amplifier; and a second direct voltage source, a second positive pole of the second direct voltage source coupled to a second non-inverting input of the second operational amplifier.

* * * * *